(12) United States Patent
Berezuk et al.

(10) Patent No.: US 7,323,078 B2
(45) Date of Patent: Jan. 29, 2008

(54) METHOD FOR PREPARING A BONDED COMPOSITE

(75) Inventors: Peter David Berezuk, Crystal Lake, IL (US); Kelly Ann McManigal Gojkovich, Lake In The Hills, IL (US); Ludwik Stanley Cygan, Cicero, IL (US); San Ardi Lee, Crystal Lake, IL (US)

(73) Assignee: Rohm and Haas Company, Philadelphia, PA (US)

( * ) Notice: Subject to any disclaimer, the term of this patent is extended or adjusted under 35 U.S.C. 154(b) by 324 days.

(21) Appl. No.: 10/686,305

(22) Filed: Oct. 15, 2003

(65) Prior Publication Data

US 2005/0081989 A1  Apr. 21, 2005

(51) Int. Cl.
*B65C 3/26* (2006.01)
(52) U.S. Cl. .............. 156/272.2; 156/275.7; 156/331.4; 428/411.1
(58) Field of Classification Search ......... 156/272.2, 156/275.7, 331.4; 428/411.1
See application file for complete search history.

(56) References Cited

U.S. PATENT DOCUMENTS

| | | | |
|---|---|---|---|
| 4,134,814 A | 1/1979 | De Poortere et al. | |
| 5,182,133 A | 1/1993 | Ono et al. | |
| 5,326,605 A | 7/1994 | Ono et al. | |
| 5,601,680 A * | 2/1997 | Kuszaj et al. | 156/242 |
| 6,132,886 A | 10/2000 | Share | |
| 6,589,651 B2 | 7/2003 | Lau et al. | |
| 6,657,011 B2 | 12/2003 | Lau et al. | |
| 2001/0025690 A1* | 10/2001 | DeLouise et al. | 156/334 |
| 2003/0066600 A1 | 4/2003 | Kauffman et al. | |

FOREIGN PATENT DOCUMENTS

| | | |
|---|---|---|
| JP | 57-8273 | 1/1982 |
| JP | 57008273 A | 1/1982 |
| JP | 59-105068 | 6/1984 |
| JP | 5-179205 | 7/1993 |
| JP | 8-81653 | 3/1996 |
| JP | 2000-80343 | 3/2000 |
| WO | WO 01/02507 | 1/2001 |

* cited by examiner

*Primary Examiner*—Terressa Boykin
(74) *Attorney, Agent, or Firm*—Carl P. Hemenway

(57) ABSTRACT

A method is provided for bonding substrates using a prepolymer composition that is cured with electron beam radiation. The prepolymer composition provided for bonding the substrates contains at least one polyester resin and at least one polymerizable compound.

16 Claims, No Drawings

METHOD FOR PREPARING A BONDED COMPOSITE

BACKGROUND

This invention relates to a method of preparing a bonded composite and to a bonded composite formed thereby. In particular, the method of this invention includes forming an uncured composite containing a prepolymer composition and curing the prepolymer composition. Further, this invention relates to a prepolymer composition. Bonded composites are prepared by bonding two or more substrates together with an interposed bonding composition. The bonding composition must adhere well to the substrates and be resistant to forces that lead to separation.

Some bonded composites are made of relatively thin, flat layers; such bonded composites are generally known as laminates. The method of this invention is useful for preparing various types of bonded composites, including laminates, especially flexible laminates. Laminates are used to provide packaging which is light-weight and flexible. Typically, laminates are formed from combinations of various polymeric films including polymeric substrates with low surface energies and metal foils bonded together by a bonding composition. It is desirable to use the bonding composition at a low application weight to minimize the weight of the laminate, to maintain flexibility, and to minimize cost.

New bonding methods are desired which allow the preparation of bonded composites from opaque substrates. Multilayered laminates are also desired which may be formed with a single cure step. One approach to these goals has been to bond the substrates with a bonding composition that is applied as a liquid and then cured by exposure to ultraviolet (uv) radiation or electron beam (e-beam) radiation. However, cure with uv radiation often requires the use of photoinitiators, and photoinitiators or the fragments of photoinitiators resulting from photolysis are generally low molecular weight materials which may adversely affect the properties of the laminate. Compositions that are curable by exposure to electron beam radiation generally do not require photoinitiators.

One approach to making bonding compositions curable with electron beams is in U.S. patent application Ser. No. 10/135,258, which discloses the use of bonding compositions formed from prepolymers that contain tackifying resins, polymerizable oligomers, and monomers; these bonding compositions are then cured by electron beam radiation. This approach requires special, potentially expensive, materials. Another approach is in JP 59105068, which uses formulations containing conventional polyester resins for electron beam curable adhesives.

However, it is desirable to further improve bonded composites by reducing the cost and performance of the bonding composition. We have found, surprisingly, that bonded composites can be made by using electron beam radiation to cure relatively inexpensive bonding compositions that contain uncurable polyester resins with acid value of 2 mg KOH/g of resin or greater.

STATEMENT OF THE INVENTION

In a first aspect of the present invention, there is provided a method of preparing a cured bonded composite comprising the steps of:

a) applying onto a first substrate, a prepolymer composition comprising in weight percent, based on the weight of said prepolymer composition:
   (i) from 15% to 70% of at least one uncurable polyester resin, wherein said resin contains fewer curable reactive groups than 0.01 mole/kg of resin, and wherein said resin has acid value of 2 mg KOH/g of resin or greater; and
   (ii) from 30% to 85% of a least one polymerizable compound;
b) contacting a second substrate with said prepolymer composition to provide an uncured composite, wherein said prepolymer composition is in contact with said first substrate and said second substrate; and
c) subjecting said uncured composite to electron beam radiation to provide said cured bonded composite.

In a second aspect of the present invention, there is provided a composition useful as an adhesive when cured by electron beam radiation comprising a prepolymer composition comprising in weight percent, based on the weight of said prepolymer composition:
   (i) from 15 to 70% of at least one uncurable polyester resin, wherein said resin contains fewer curable reactive groups than 0.01 mole/kg of resin, and wherein said resin has acid value of 2 mg KOH/g of resin or greater; and
   (ii) from 30 to 85% of a least one polymerizable compound.

DETAILED DESCRIPTION

As used herein, "(meth)acrylic" means acrylic or methacrylic, and "(meth)acrylate" means acrylate or methacrylate.

The present invention includes the use of a prepolymer composition that includes at least one uncurable polyester resin. Polyester resins are well known in the art, as described for example by K. J. Saunders in *Organic Polymer Chemistry*, Chapman and Hall, London, 1973. Polyester resins are resins that contain the recurring group

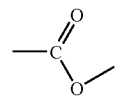

in the main chain. Suitable polyester resins include, for example, linear saturated polyester resins, other saturated polyester resins, polycarbonates, and mixtures thereof. As used herein, "resins" include any compounds formed by joining multiple monomer units; such compounds may be referred to elsewhere as oligomers, resins, and/or polymers. Polyester resins of all molecular weights are suitable for use in the present invention.

"Uncurable" polyester resins, as used herein, are those that contain few or no curable reactive groups. Curable reactive groups are those capable of participating in the cure reaction that takes place when the prepolymer composition of the present invention is exposed to electron beam radiation. Due to imperfections in manufacture or to degradation on storage, resins that are considered essentially free of reactive groups may actually have a small number of reactive groups. Preferred are polyester resins with 0.1 or fewer moles of reactive groups per kilogram of resin; more preferred is 0.01 or fewer; even more preferred is 0.003 or fewer; still more preferred is 0.001 or fewer, and most preferred is none.

Some common reactive groups that are used in electron beam curing compositions are double bonds in the form of acrylic groups or other vinyl groups. Consequently, polyester resins containing acrylic or other vinyl groups in large amounts do not qualify as uncurable polyester resins in the present invention. However, double bonds contained in aromatic rings are known to generally be inert during curing under electron beam radiation. Consequently, polyester resins containing aromatic rings may be suitable as uncurable polyester resins of the present invention, if they contain few or no curable reactive groups.

Some of the uncurable polyester resins suitable for use in the present invention are made by reacting components that include at least one polyol with at least one polycarboxylic acid. Polyols are compounds with two or more hydroxyl groups on each molecule. Suitable polyols include, for example, hydrocarbons with two or more hydroxyl groups. Hydrocarbon portions may be aromatic, aliphatic, or complex with both aliphatic and aromatic substructures. Aliphatic portions or substructures thereof may be cyclic, linear, branched, or combinations thereof. In any one polyol, the hydroxyl groups may be primary, secondary, or one or more of each. Mixtures of suitable polyols are also suitable. Preferred are polyols with hydrocarbon portions that are aliphatic. Suitable polyols may be diols (i.e., polyols with two hydroxyl groups per molecule) or they may may have three or more hydroxyl grops per molecule. Mixtures of suitable polyols are also suitable. Some suitable polyols with three or more hydroxyl groups per molecule include, for example, trimethylolpropane, trimethylolmethane, glycerine, long-chain trihydroxy compounds, and mixtures thereof. Preferred are diols, including for example ethylene glycol, diethylene glycol, triethylene glycol, 1,2-propylene glycol, dipropylene glycol, 1,4-butane diol, 1,6-hexane diol, neopentyl glycol, derivatives of neopentyl glycol, 1,3-butane diol, long-chain dihydroxy compounds, and mixtures thereof. Preferred diols are neopentyl glycol, derivatives of neopentyl glycol, 1,6-hexane diol, and mixtures thereof.

Polyester resins suitable as uncurable polyester resin in the present invention may be made by reacting components that include one or more polyols and one or more polycarboxylic acids. Polycarboxylic acids are compounds with two or more carboxylic acid groups on each molecule. In the practice of the present invention, one or more polycarboxylic acid may be an anhydride; in the formation of polyesters, an anhydride group is believed to function as two carboxylic acid groups, as described for example by K. Schauerte, et. al. in "Polyols," in *Polyurethane Handbook*, 2nd Edition, edited by G. Oertel, Hanser, 1993. Preferred are dicarboxylic acids; i.e., those polycarboxylic acids with two carboxyl groups per molecule. Polycarboxylic acids may be aliphatic, cyclic aliphatic, aromatic, or mixtures thereof. Aliphatic polycarboxylic acids may have linear, cyclic, or branched hydrocarbon structures with 2 to 30 carbon atoms. Some suitable aliphatic polycarboxylic acids include for example adipic acid, short-chain aliphatic diacids such as oxalic, succinic, and glutaric, long chain aliphatic diacids such as azaleic and sebacic, and mixtures thereof. Preferred are aromatic polycarboxylic acids; more preferred are aromatic dicarboxylic acids; still more preferred are phthalic acid, phthalic anhydride, isophthalic acid, isophthalic anhydride, terephthalic acid, and mixtures thereof. Mixtures of suitable polycarboxylic acids are also suitable.

Preferred as uncurable polyester resin of the present invention are polyester resins made from mixtures of polycarboxylic acids and polyols in which the molar ratio of carboxyl groups to hydroxyl groups equals or exceeds 1.0. Preferred are mixtures in which the ratio exceeds 1.02; more preferred are mixtures that exceed 1.04. While the invention is not limited to any specific mechanism, it is believed that a molar excess of carboxyl groups yields a resin that has free carboxyl groups attached to the polymer chain, possibly on the ends of the polymer chain, and that these free carboxyl groups improve the ability of the cured prepolymer composition to adhere effectively to some substrates such as polyethylene terephthalate. By "free carboxyl" is meant herein carboxyl groups that have not reacted with hydroxyl groups or other moeities to form new covalent bonds.

The desired molecular weight of the polyester resins will depend, among other factors, on the viscosity that is desired for the prepolymer composition to have during application to a substrate. Generally, higher molecular weight polyester resins are believed to lead to higher viscosity in the prepolymer composition. Also, higher temperatures generally reduce the viscosity of the prepolymer composition. Thus, in some embodiments, relatively high molecular weight polyester resins may be used, and the application to substrate may be performed at temperatures above room temperature (room temperature herein means 18° C. to 30° C.).

In some embodiments of the present invention, uncurable polyester resins have number-average molecular weight (Mn, measured by size-exclusion chromatography), of at least 500; preferably at least 1,000; and more preferably at least 1,500. In some embodiments, uncurable polyester resins have Mn of 20,000 or less; preferably 10,000 or less; more preferably 6,500 or less; and still more preferably 3,500 or less. Other embodiments of the present invention, typically those intended to be applied to substrate at temperatures above room temperature, preferably have molecular weight of 100,000 or less; more preferably 60,000 or less.

In some embodiments of the present invention, uncurable polyester resins have glass transition temperature (Tg, measured by dynamic scanning calorimetry) of 0° C. or higher; more preferably 110° C. or higher; even more preferably 15° C. or higher. In some embodiments, the uncurable polyester resins have Tg of 200° C. or less; preferably 150° C. or less.

In some embodiments of the present invention, the uncurable polyester resin has free acid groups attached to the resin. Free acid groups are those that have not reacted covalently with other chemicals. Preferred are free carboxylic acid groups. The amount of free acid groups can be characterized by the acid value of the resin, which is the weight in milligrams of potassium hydroxide (KOH) required to neutralize the free acid groups in one gram of resin. Acid value can be measured by a variety of methods known in the art, including for example ASTM D 1639. Preferred are uncurable polyester resins with acid value of 2 mg KOH/g of resin or greater; more preferred is 5 mg KOH/g of resin or greater; even more preferred is 15 mg KOH/g of resin or greater; most preferred is 30 mg KOH/g of resin or greater. Also preferred are uncurable polyester resins with acid value of 200 mg KOH/g of resin or less; more preferred is 150 mg KOH/g of resin or less; even more preferred is 100 mg KOH/g of resin or less; most preferred is 60 mg KOH/g of resin or less.

In some embodiments of the present invention, polyester resins are made by a process employing a catalyst, preferably a catalyst containing at least one metal, most preferably a catalyst containing tin. Catalysts are thought to improve the efficiency of the manufacturing process of the uncurable polyester resin.

One compound known to be suitable as a uncurable polyester resin is Ebecryl™ Eb 524, an acid-modified polyester resin in acrylic monomer diluent, supplied by UCB Chemicals.

In some embodiments of the present invention, a suitable amount of uncurable polyester resin in the prepolymer composition is 15% or more by weight based on the weight of the prepolymer composition; preferred is 25% or more; more preferred is 35% or more. In some embodiments, a suitable amount of uncurable polyester resin is 70% or less by weight based on the weight of the prepolymer composition; preferred is 60% or less; more preferred is 50% or less. Amounts of resin that are too low are known to hurt the composition's ability to attach to some substrates. Amounts of resin that are too high are known to increase the viscosity of the composition; for some application methods, extremely high viscosity may be undesirable.

It is contemplated that in the practice of the present invention, since a suitable uncurable polyester resin is included in the composition, other ingredients in the composition may include a polyester resin that does not qualify as a suitable uncurable polyester resin.

The present invention includes the use of a prepolymer composition that includes at least one polymerizable compound. Polymerizable compounds as used herein are compounds that are capable of reacting with each other to form one or more polymers during or after the prepolymer composition is exposed to electron beam radiation. The process of forming one or more polymers will be called herein polymerization or, synonymously, curing. Polymerization commonly occurs because each molecule of each polymerizable compound contains one or more reactive groups that react with reactive groups on other molecules to form the polymer. Compounds containing polymerizable double bonds are known to be suitable as polymerizable compound in the present invention.

Suitable polymerizable compounds may be monomers, oligomers, resins, polymers, or mixtures thereof. Monomers are polymerizable compounds with relatively low molecular weight, usually 1,000 or less. Oligomers are linear, branched, or star compounds of 2 to 10 monomer units. Polymers, are linear, branched, star, or crosslinked compounds of 11 or more monomer units. For any oligomer, resin, or polymer to qualify as polymerizable compound, it must be capable of further polymerization during or after exposure to electron beam radiation. Each molecule of suitable polymerizable compound may have one or more reactive groups capable of participating in a polymerization reaction.

Preferred are polymerizable compounds with low volatility. Generally, compounds with relatively high boiling points are believed to have low volatility. Preferred as polymerizable compounds in the present invention are compounds with boiling point of 60° C. or above; more preferred is 80° C. or above; even more preferred is 100° C. or above, and most preferred is 120° C. or above.

A preferred class of compounds suitable for use in the present invention as polymerizable compound are acrylic compounds, which are any compounds containing (meth)acrylic groups. Suitable acrylic compounds include, for example, (meth)acrylic acid, esters of (meth)acrylic acid, adducts of (meth)acrylic acid and/or (meth)acrylate esters with other functional compounds, and mixtures thereof. Among the esters of (meth)acrylic acid that are suitable for use as polymerizable compound are, for example, alkyl esters of (meth)acrylic acid; hydroxyl containing esters of (meth)acrylic acid such as for example hydroxyethyl (meth)acrylate; ring containing esters of (meth)acrylic acid such as for example isobornyl (meth)acrylate; esters of (meth)acrylic acid containing other groups such as for example ethylene oxide, allyl groups, glycidyl groups, and the like.

Among acrylic compounds suitable as polymerizable compound are esters of (meth)acrylic acid or other substituted acrylic acid compounds with polyols. Preferred are esters of (meth)acrylic acid with polyols. One or more hydroxyl groups of the polyol may be esterified with acrylic acid, methacrylic acid, or a mixture thereof, and a suitable polymerizable compound may have a mixture of polyol molecules in which various combinations of one, two, three, four, or more hydroxyl groups are esterified. Some suitable polyols include, for example, ethylene glycol, propylene glycol, glycerol, pentaerythritol, trimethylolpropane, 1,6 hexane diol, other hexane diols, butane diols, polymeric polyols (such as polyethylene glycol, polypropylene glycol, and copolymers thereof), and mixtures thereof. Also suitable are polyols in which one or more hydroxyl groups is alkoxylated, such as for example ethoxylated pentaerythritol, propoxylated pentaerythritol, ethoxylated trimethylolpropane, propoxylated trimethylolpropane, ethoxylated hexane diols, propoxylated hexane diols, similar polyols in which some hydroxyls are ethoxylated and other hydroxyls are propoxylated, and mixtures thereof. Some preferred esters are ethoxylated pentaerythritol tetraacrylate, ethoxylated trimethylolpropane triacrylate, alkoxylated hexanediol diacrylate, and mixtures thereof.

Also included in the class of acrylic compounds suitable for use as polymerizable compounds of the present invention are adducts of any of the above acrylic compounds with other functional compounds such as for example epoxy compounds, isocyanates, or phosphate compounds. Examples of adducts of (meth)acrylic compounds with other functional compounds that are suitable as a polymerizable compound include for example, the adducts of alkyl isocyanates with hydroxyalkyl (meth)acrylates and acrylate-terminated phosphate esters. One such adduct known to be suitable as a polymerizable compound is Ebecryl™ CL 1039, a urethane monoacrylate monomer supplied by UCB chemicals.

Compounds are suitable for use in the present invention because of their chemical structure, regardless of the method of synthesis or manufacture. Consequently, it is to be understood that, in the descriptions herein of chemical compounds herein, words like "esterified" and "adducts" and "ethoxylated" are used to describe chemical structures, regardless of the method of making those chemicals.

In addition to (meth)acrylate compounds, other polymerizable compounds are suitable for use in the present invention as polymerizable compound. Suitable compounds include for example ethylenically unsaturated compounds such as vinyl acetate, derivatives of vinyl acetate, substituted vinyl acetate compounds, styrene, substituted styrenes such as alpha-methyl styrene, and mixtures thereof. Also suitable are other compounds that are able to polymerize or copolymerize during or after exposure to electron beam radiation such as for example urethanes, epoxies, anhydrides, compounds capable of ring-opening polymerization, and mixtures thereof.

One group of compounds suitable for use in the present invention as polymerizable compounds are acrylic oligomers: that is, oligomers made fully or partially from acrylic monomers. Some suitable such oligomers may be made by reacting one or more acrylic monomers with each other to form an oligomer. Other suitable acrylic oligomers may be made by reacting one or more acrylic monomers with other compounds to form suitable oligomers. When oligomers are used, preferred are those obtained by reaction of one or more (meth)acrylic acid, (meth)acryloyl halide, and/or (meth) acrylate ester with one or more of hydroxy-containing alkyd resins, polyester condensates, or polyether condensates, as disclosed in U.S. patent application Ser. No. 10/135,258.

Another group of compounds suitable for use in the present invention as polymerizable compounds are polymers capable of further curing when exposed to electron beam radiation. One group of such polymers have one or two terminal ethylenically unsaturated groups; some water-insoluble examples of such polymers are disclosed in U.S. patent application Ser. No. 09/951,924.

Any mixtures of polymerizable compounds suitable for use in the present invention will also be suitable as polymerizable compound. Preferred are polymerizable compounds that monomers, oligomers, and mixtures thereof; more preferred are polymerizable compounds that contain only monomers; still more preferred are polymerizable compounds that contain only acrylic monomers.

The prepolymer composition of the present invention may also contain compounds in addition to uncurable polyester resin and polymerizable compound. Examples of additional compounds include diluents; solvents; and additives that improve the flow of the composition, that help the composition wet the substrate, that reduce foaming, or that adjust the viscosity of the composition. Preferred are compositions that use little or no solvent. One useful class of additional compounds are wetting agents, i.e., those believed to improve the ability of the composition to wet the substrate; one class of wetting agents is polyether-modified polydimethyl siloxane compounds. Wetting agents, when they are used, they are generally used at levels of 2% or less by weight based on the weight of the prepolymer composition; preferred are levels of 1% or less. When wetting agents are used, they are generally used at levels of 0.01% or more by weight based on the weight of the prepolymer composition; preferred are levels of 0.1% or more.

Another class of additional compounds that may be included in the practice of the present invention is the class of tackifying resins, as disclosed in U.S. patent application Ser. No. 10/135,258. Tackifying resins are rosins, hydrogenated rosins, terpene resins, esters thereof, polymers thereof, and derivatives thereof. In the present invention, preferred prepolymer compositions do not include tackifying resins.

The ingredients of the prepolymer composition of the present invention may be combined by any means. Usually, the ingredients are brought together in a container with stirring. Preferably, the ingredients are combined in such a way as to make a uniform solution. The ingredients may be heated in order to improve or speed up the process of making a uniform solution.

In the prepolymer composition of the present invention, a suitable amount of polymerizable compound is 30% or more by weight based on the weight of the prepolymer composition; preferred is 40% or more; more preferred is 50% or more. Also suitable are amounts of polymerizable compound that are 85% or less by weight, based on the weight of the prepolymer composition; preferred is 75% or less; more preferred is 65% or less.

In the practice of the present invention, the prepolymer composition is applied onto a substrate. Application may be performed by any means, including for example, manual or mechanical spreading. Suitable application methods include for example roll coating, rod coating, gravure, Meyer bar, and the like. The applied prepolymer composition may form a continuous or discontinuous layer. The amount of prepolymer composition that is applied to the substrate will depend on the substrates and on the use to which the bonded composite will be put. In some embodiments, a preferable amount of applied prepolymer composition is at least 0.000325 kg/m$^2$ (0.2 lb/ream); more preferable is at least 0.00114 kg/m$^2$ (0.7 lb/ream); still more preferable is at least 0.00146 kg/m$^2$ (0.9 lb/ream). Also, in some embodiments, a preferable amount of applied prepolymer composition is 0.00448 kg/m$^2$ (3 lb/ream) or less; more preferable is 0.00211 kg/m$^2$ (1.3 lb/ream) or less, and still more preferable is 0.00179 kg/m$^2$ (1.1 lb/ream) or less.

Those skilled in the art will recognize that the most desirable viscosity for the prepolymer composition will depend on the choice of coating method. Generally, using less uncurable polyester resin will tend to lower the viscosity. For use with a roll coater, preferred viscosity is 1.0 to 5.0 Pa·s (1,000 to 5,000 cps).

In the practice of the present invention, after the prepolymer composition is applied to a first substrate, it is contacted with a second substrate to form a composite structure, which is optionally subjected to applied pressure such as by passing it between rollers to effect increased contact of the substrates with the prepolymer composition. In another embodiment the prepolymer composition may be simultaneously or sequentially applied to two surfaces of the first substrate, which coated surfaces are then simultaneously or sequentially bonded to two further substrates, which may be the same or different. It is further contemplated that the composite structure may subsequently be bonded to one or more other substrates using the same or a different adhesive before or after the process described herein. The substrates to be bonded in the method of this invention may be the same or different and include, for example, metal, wood, paper, elastomers, woven and nonwoven fabrics, and plastics which may have smooth or textured surfaces and are provided in the form of rolls, sheets, films, foils, etc. Suitable substrates include for example plywood, paper, impregnated paper, polystyrene foam, polyester film, polyester fabric, aluminum, steel, polyvinyl chloride, natural and synthetic rubber, polymer blends, and engineering plastics. Preferred are substrates made from non-porous materials such as, for example, polymers, metals, or rubbers. Generally, nylon is thought to be less preferred because it is believed to degrade when exposed to electron beam radiation.

In some embodiments of the present invention, the substrates that are bonded are relatively thin and flat, and in such cases the composite article is called a laminate or laminated structure. Some flat substrates known to be suitable for the practice of the present invention include for example untreated polyethylene terephthalate (PET) films, PET films treated by corona discharge, PET films with chemically treated surface, polyethylene films, including low density polyethylene films, and metalized polymer films.

Photoinitiators are compounds that do not participate in polymerization but that form one or more radicals when exposed to radiation. Generally, photoinitiators are not needed in compositions that are cured by exposure to electron beam radiation. In the practice of the present invention, preferred prepolymer compositions contain amounts of photoinitiator that are so low as to be ineffective; that is, any photoinitiator present is so dilute as to have no appreciable effect on the cured composite; more preferred are prepolymer compositions that contain no photoinitiator.

In the practice of the present invention, the uncured composite structure is subjected to electron beam radiation to cure the prepolymer composition. Suitable minimum dosage of electron beam radiation will be sufficient to create a bond strength that is useful and to reduce the amount of non-polymerized material to acceptable levels. The dose of radiation is measured in SI units called "gray," abbreviated Gy, equivalent to 1 Joule of energy per kilogram of irradiated material, as described in "An Introduction to Radiation Units and Measurement," by H. C. Biggin, in *Irratiation Effects on Polymers*, edited by D W Clegg et. al., Elsevier, 1991. One thousand gray units is one kilogray, or kGy. Another dosage unit is the rad, equivalent to 100 erg/gram; 1 Gy=100 rad. In some embodiments, 5 kGy, (0.5 Megarad, abbreviated Mrad) or greater is suitable; preferred is 10 kGy (1 Mrad) or greater; more preferred is 20 kGy (2 Mrad) or greater. Too high a dosage of electron beam radiation requires extra expense and slows down the production of bonded composite. In some embodiments, 200 kGy (20 Mrad) or less is suitable; preferred is 100 kGy (10 Mrad) or less; more preferred is 70 kGy (7 Mrad) or less; still more preferred is 50 kGy (5 Mrad) or less.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated.

In the following Examples, these abbreviations are used:
PET: polyethylene terephthalate.
LDPE: low density polyethylene.
PDMS: polydimethyl siloxane.
PM-PDMS: polyether-modified PDMS.
HDODA: 1,6 hexane diol diacrylate.
PETA: pentaerythritol tetraacrylate.
TMPTA: trimethylolpropane triacrylate.
TPGDA: tripropylene glycol diacrylate.
2-HEMA 2-hydroxyethyl methacrylate.

In the following Examples, the following commercial materials are used:

| | |
|---|---|
| Ebecryl ™ Eb 524: | an acid-modified polyester resin, diluted 30% in HDODA, supplied by UCB Chemicals |
| Ebecryl ™ CL 1039: | a urethane monoacrylate monomer, supplied by UCB Chemicals |
| SR 494 | ethoxylated pentaerythritol tetraacrylate, supplied by Sartomer Company |
| SR 502 | ethoxylated trimethylolpropane triacrylate, supplied by Sartomer Company |
| CD 560 | alkoxylated hexane diol diacrylate, supplied by Sartomer Company |
| CD 9052 | trifunctional acid ester, supplied by Sartomer Company |
| Ebecryl ™ 810 | tetrafunctional acrylate polyester resin, supplied by UCB Chemicals |
| SR 238 | HDODA, supplied by Sartomer Company |
| SR 259 | polyethylene glycol (200) acrylate, from Sartomer Company |
| Morcure ™ 2000 | epoxy-modified oligomer blend, supplied by Rohm and Haas Company |
| Byk ™ 346 | PM-PDMS from Byk Chemie |
| SR 306 | TPGDA, supplied by Sartomer Company |
| SR 351 | TMPTA, supplied by Sartomer Company |
| Rocryl ™ 400 | 2-HEMA, supplied by Rohm and Haas Company |

EXAMPLES

In the following examples, the amounts used are specified as "parts," meaning parts by weight.

Comparative C1

22.35 parts of EBECRYL™ Eb 524 was diluted with 22.35 parts of a monomer blend of equal portions by weight of ethoxylated pentaerythritol tetraacrylate, ethoxylated trimethylolpropane triacrylate, and alkoxylated hexane diol diacrylate. Added to the formulation were 15.98 parts of Ebecryl™ 810; 25 parts of SR 238; and 0.5 parts of Byk™ 346.

The resulting formulation had approximately 40% resin solids by weight and viscosity of 1.0–1.5 Pa·s (1,000 to 1,500 cps).

The formulation was coated onto corona-treated polyester film at a rate of 0.001626 kg/m$^2$ (1 lb/ream).

Example 2

70 parts of EBECRYL™ Eb 524 was further diluted with 23 parts of SR 306. Added to the formulation were 0.5 parts of SR 351, and 6 parts of Rocryl™ 400. Also added were 0.5 parts of Byk™ 346. The formulation was coated onto four different PET films: untreated film, corona treated film, and films treated with two different chemical treatments.

Example 3

A polyester resin P1 was made by reacting phthalic anhydride, ethylene glycol, and neopentyl glycol in molar ratio of 45/34/6, respectively. 45 parts of of resin P1 was dissolved in 27.5 parts of SR 306 and 27 parts of Rocryl™ 400. Added to the formulation were 0.5 parts of Byk™ 346. The formulation was coated onto two different PET films: corona treated film, and films treated with one of the chemical treatments used in Example 2.

Example 4

A polyester resin P2 was made by reacting phthalic anhydride, isophthalic acid, ethylene glycol, neopentyl glycol, and 1,6 hexane diol in molar ratio of 50/1/42/4/3, respectively. 45.5 parts of resin P2 was dissolved in 27 parts of SR 306 and 27 parts of Rocryl™ 400. Added to the formulation were 0.5 parts Byk™ 346. The formulation was coated onto corona treated PET film.

Example 5

40 parts of the polyester resin P2 from Example 4 was dissolved in 59.5 parts of Ebecryl™ CL 1039. Added to the formulation were 0.5 parts of Byk™ 346. The formulation was coated onto corona treated PET film.

Example 6

Results of Supported T-Peel Tests

Each of the coated PET films described in Comparative C1 and Examples 2–5 was laminated to a film of LDPE and passed between rubber rollers under pressure from a hydraulic system at 414 kPa (60 psi). The laminate was then passed through an ESI high-energy unit at web speed of 0.127 m/sec (25 ft/minute), with electron beam radiation intensity sufficient to give a dose of 3 Mrads.

Laminates of width of 25.4 mm (1 inch) were conditioned at 22° C. (72° F.) and 50% relative humidity and then tested at the same temperature and humidity on an Instron Model 1011 tensile tester at crosshead speed of 4.23 mm/sec (10 in/min), in a supported T-peel geometry. That is, at one end of the laminated strip, the two substrates are in opposite jaws of the test machine, forming a "T" with the tail of the laminated strip. The end of the tail is supported to maintain an angle of 90° between the bonded portion of the laminated strip and the direction of the crosshead. The measured loads are reported as grams of force per 25.4 mm width (grams per lineal inch). The loads obtained in the T-peel tests were as follows:

| Example No. | PET film treatment type | T-peel load (g/25.4 mm width) |
| --- | --- | --- |
| C1 | corona | 150–190 |
| 2 | untreated | 30–50 |
| 2 | corona | 300–500 |
| 2 | first chemical | 400–600 |
| 2 | second chemical | 400–600 |
| 3 | corona | 1,000–1,500 |
| 3 | chemical | 900–1,200 |
| 4 | corona | 800–1,100 |
| 5 | corona | 800–1,200 |

Example 7

A formulation was made by mixing the following ingredients:

| Ingredient | Parts |
| --- | --- |
| Ebecryl ™ Eb 524 | 61.4 |
| Ebecryl ™ CL 1039 | 21.0 |
| SR 259 | 8.8 |
| CD 9052 | 8.8 |

The formulation was coated onto chemically-treated PET film and laminated to a metallized PET film and passed between rubber rollers under pressure from a hydraulic system at 414 kPa (60 psi). The laminate was passed through an electron beam unit at a speed of 127 mm/s (25 feet/min), with electron beam voltage of 155 kV and a dose of 30 kGy (3 Mrad). The laminate was tested as in Example 6, with T-peel value of 300 to 500 g/25.4 mm width.

We claim:

1. A method of preparing a cured bonded composite; wherein said cured bonded composite comprises two or more substrates bonded together with an interposed bonding composition; wherein said method comprises the steps of:
   a) applying onto a first substrate, a prepolymer composition, wherein said prepolymer composition comprises, in weight percent, based on the weight of said prepolymer composition:
      (i) from 15% to 70% of at least one uncurable polyester resin,
         wherein said uncurable polyester resin is the reaction product of reacting one or more hydrocarbon having two or more hydroxyl groups with one or more polycarboxylic acid that is aliphatic, cyclic aliphatic, or aromatic,
         wherein said resin contains fewer curable reactive groups than 0.01 mole/kg of resin,
         wherein said resin has number-average molecular weight of 6,500 or less, and
         wherein said resin has acid value of 2 mg KOH/g of resin or greater; and
      (ii) from 30% to 85% of a least one polymerizable compound;
   b) contacting a second substrate with said prepolymer composition to provide an uncured composite, wherein said prepolymer composition is in contact with said first substrate and said second substrate; and
   c) subjecting said uncured composite to electron beam radiation to provide said cured bonded composite;
   wherein each said polymerizable compound in said prepolymer composition is a monomer or oligomer selected from the group consisting of alkyl esters of (meth)acrylic acid, hydroxyl containing esters of(meth)acrylic acid, ring containing esters of (meth)acrylic acid, esters of(meth)acrylic acid containing ethylene oxide, esters of (meth)acrylic acid containing glycidyl groups, esters of (meth)acrylic acid with polyols, adducts of acrylic compounds with epoxy compounds, adducts of acrylic compounds with phosphate compounds, acrylic oligomers, ethylenically unsaturated compounds other than (meth)acrylate compounds, and mixtures thereof; and
   wherein said prepolymer composition is capable of being applied onto a substrate by one or more of roll coating, rod coating, gravure, or Meyer bar, and
   wherein said prepolymer composition contains no solvent.

2. The method of claim 1, wherein said polymerizable compound comprises at least one monomer selected from the group consisting of ester-s of acrylic acid with a polyol, esters of methacrylic acid with a polyol, and mixtures thereof.

3. The method of claim 1, wherein said uncured composite is subjected to said electron beam radiation with a dose of 20 kGy (2 Mrad) to 70 kGy (7 Mrad).

4. A composition useful as an adhesive when cured by electron beam radiation comprising a prepolymer composition, wherein said prepolymer composition comprises, in weight percent, based on the weight of said prepolymer composition:
   (i) from 15% to 70% of at least one uncurable polyester resin,
      wherein said uncurable polyester resin is the reaction product of reacting one or more hydrocarbon having two or more hydroxyl groups with one or more polycarboxylic acid that is aliphatic, cyclic aliphatic, or aromatic,
      wherein said resin contains fewer curable reactive groups than 0.01 mole/kg of resin,
      wherein said resin has number-average molecular weight of 6,500 or less, and
      wherein said resin has acid value of 2 mg KOH/g of resin or greater; and
   (ii) from 30% to 85% of a least one polymerizable compound;
   wherein each said polymerizable compound in said prepolymer composition is a monomer or oligomer selected from the group consisting of alkyl esters of (meth)acrylic acid, hydroxyl containing esters of(meth)acrylic acid, ring containing esters of(meth)acrylic acid, esters of(meth)acrylic acid containing ethylene oxide, esters of(meth)acrylic acid containing glycidyl groups, esters of (meth)acrylic acid with polyols, adducts of acrylic compounds with epoxy compounds, adducts of acrylic compounds with phosphate compounds, acrylic oligomers, ethylenically unsaturated compounds other than (meth)acrylate compounds, and mixtures thereof, wherein said prepolymer composition is a uniform solution; and wherein said prepolymer composition is capable of being applied onto a substrate by one or more of roll coating, rod coating, gravure, or Meyer bar, and wherein said prepolymer composition contains no solvent.

5. The composition of claim 4, wherein said polymerizable compound comprises at least one monomer selected from the group consisting of esters of acrylic acid with a polyol, esters of methacrylic acid with a polyol, and mixtures thereof.

6. The composition of claim 4, wherein said prepolymer composition contains no effective amount of photoinitiator.

7. The composition of claim 4, wherein said prepolymer composition has viscosity of 1.0 to 5.0 Pa*s.

8. The method of claim 1, wherein said prepolymer composition contains no effective amount of photoinitiator.

9. The method of claim 1, wherein said prepolymer composition has viscosity of 1.0 to 5.0 Pa*s.

10. The method of claim 1, wherein said step of applying is performed by roll coating, rod coating, gravure, or Meyer bar.

11. The method of claim 2, wherein said polyol is selected from the group consisting of ethylene glycol, propylene glycol, glycerol, pentaerythritol, trimethylolpropane, hexane diols, butane diols, polyethylene glycol, polypropylene glycol, ethylene-propylene copolymer glycol, ethoxylated pentaerythritol, propoxylated pentaerythritol, ethoxylated trimethylolpropane, propoxylated trimethylolpropane, ethoxylated hexane diols, propoxylated hexane diols, and mixtures thereof.

12. The method of claim 1, wherein all of said polymerizable compounds are selected from the group consisting of monomers, oligomers made by reacting one or more acrylic monomers with each other, and mixtures thereof.

13. The method of claim 12, wherein all of said polymerizable compounds are monomers.

14. The composition of claim 5, wherein said polyol is selected from the group consisting of ethylene glycol, propylene glycol, glycerol, pentaerythritol, trimethylolpropane, hexane diols, butane diols, polyethylene glycol, polypropylene glycol, ethylene-propylene copolymer glycol, ethoxylated pentaerythritol, propoxylated pentaerythritol, ethoxylated trimethylolpropane, propoxylated trimethylolpropane, ethoxylated hexane diols, propoxylated hexane diols, and mixtures thereof.

15. The composition of claim 4, wherein all of said polymerizable compounds are selected from the group consisting of monomers, oligomers made by reacting one or more acrylic monomers with each other, and mixtures thereof.

16. The composition of claim 15, wherein all of said polymerizable compounds are monomers.

* * * * *